Feb. 27, 1968 P. BAUER 3,370,906
VISUAL READOUT DEVICE FOR A FLUID DATA PROCESSING SYSTEM
Filed July 28, 1964 2 Sheets-Sheet 1
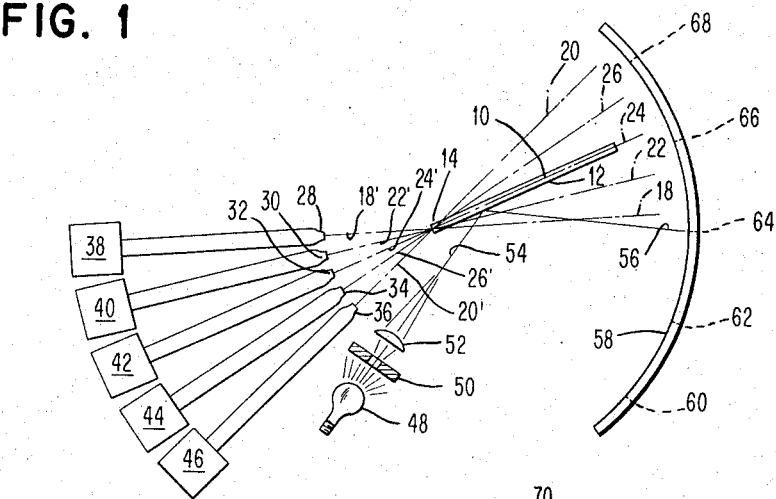
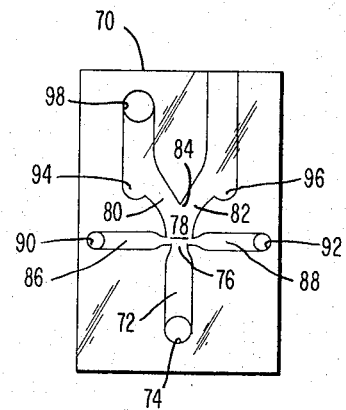
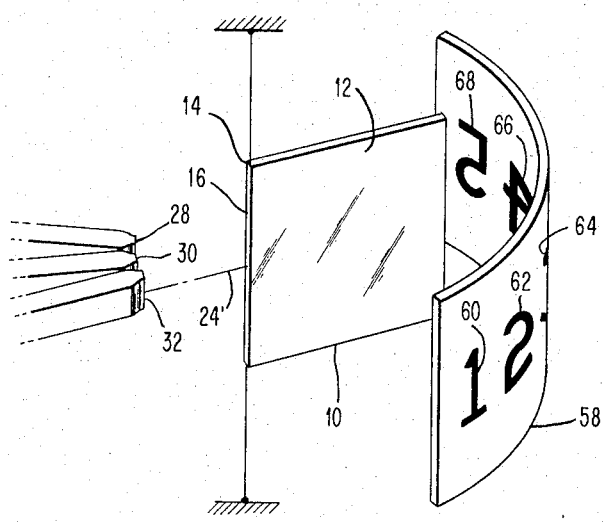
INVENTOR
PETER BAUER
BY Griffin and Stokes
ATTORNEYS Feb. 27, 1968  P. BAUER  3,370,906
VISUAL READOUT DEVICE FOR A FLUID DATA PROCESSING SYSTEM
Filed July 28, 1964  2 Sheets-Sheet 2
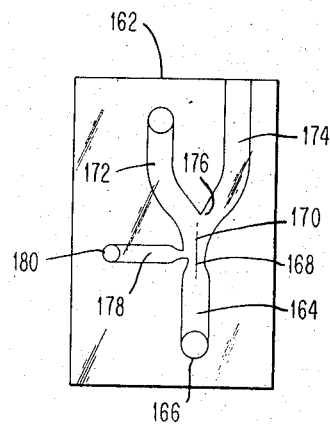
FIG. 7
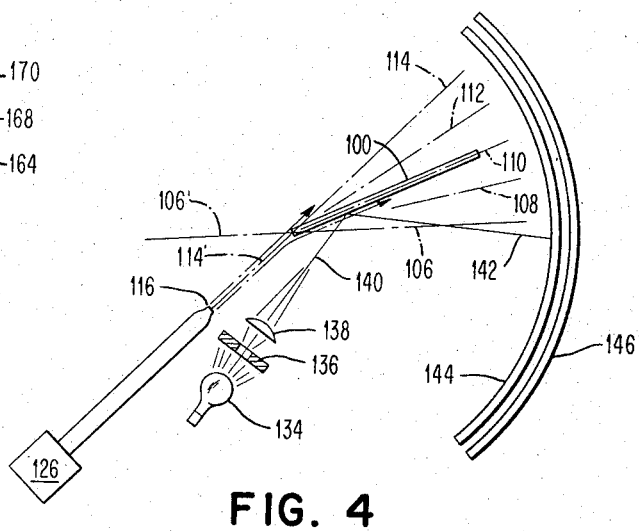
FIG. 4
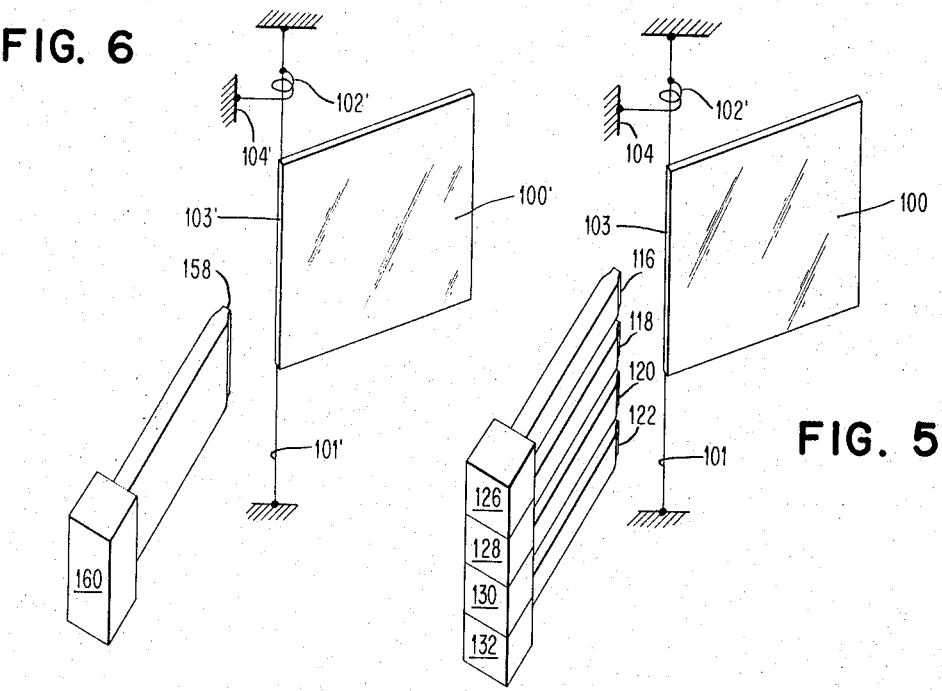
FIG. 6
FIG. 5

United States Patent Office 3,370,906
Patented Feb. 27, 1968

3,370,906
VISUAL READOUT DEVICE FOR A FLUID
DATA PROCESSING SYSTEM
Peter Bauer, Germantown, Md., assignor to Sperry
Rand Corporation, New York, N.Y., a corporation
of Delaware
Filed July 28, 1964, Ser. No. 385,626
8 Claims. (Cl. 350—285)

ABSTRACT OF THE DISCLOSURE

A fluid indicator is provided in which a pivoted radiant energy reflecting element of a weather vane type is utilized and wherein the deflection of the element about its pivot axis is determined by fluid pressure applied to the surface of the element. A radiant energy source is projected onto the reflecting surface of the element and the resulting reflection is in turn projected onto a display scale.

---

The present invention generally relates to fluid positioned means for changing the angle of reflected radiant energy, and more particularly is concerned with a display device to convert a fluid signal into a visual indication.

The advent of pure fluid data processing systems, wherein information in the form of fluid signals is manipulated to arrive at some result, has required the use of energy transducers particularly for readout of the system. For example, when some intermediate or final result of a data processing step produces fluid flow in only one of a plurality of fluid conduits, this fact might need to be communicated to a human observer. Other examples are those where the particular magnitude of fluid flow in a conduit must be communicated to the observer, or where must be known the total number of conduits through which fluid flows. The present invention provides means for achieving the above described functions at relatively fast response times by providing a modified light beam galvanometer type suspension system having a weather vane type of pivoted mirror. Nozzles for issuing the mirror deflecting fluid are spaced in one embodiment such that each nozzle when exclusively actuated causes one particular deflection angle of the mirror which in turn causes one particular character or other indicia on a screen to be illuminated by change in the angle of a beam reflected from said mirror. Other embodiments of the invention provide mirror deflection proportional either to the total number of nozzles activated, or proportional to the strength of a jet from a single nozzle. Response times are obtained which are considerably higher than needed for a visual display, since commercially available galvanometer systems have full scale responses up to five kilocycles.

Therefore, one object of the present invention is to provide apparatus to convert a fluid signal indication into a radiant energy output which is particularly useful in a visual display device.

Another object of the invention is to provide a pivoted reflecting mirror suspension of a weather vane type wherein deflection of the mirror about its pivot is determined by fluid pressure applied thereagainst.

A further object of the present invention is to provide apparatus utilizing a weather vane type of suspended mirror whose deflection is determined by which one of a group of jet nozzles has a fluid jet stream emerging therefrom.

Yet another object of the present invention is to provide a weather vane type of mirror suspension whose deflection is determined by the total number of fluid jet nozzles having fluid emerging therefrom.

Still another object of the present invention is to provide a weather vane type of mirror suspension whose deflection is determined by the magnitude of fluid flow emerging from a single jet nozzle.

These and other objects of the present invention will become apparent during the course of the following description, to be read in view of the drawings, in which:

FIGURE 1 is a plan view showing a first species of the present invention;

FIGURE 2 is a perspective view showing a portion of said first species;

FIGURE 3 illustrates a typical pure fluid amplifier which may be used as a fluid source in said first species;

FIGURE 4 is a plan view of a second species of the present invention;

FIGURE 5 is a perspective view showing part of said second species;

FIGURE 6 is a perspective view showing part of a third species of the present invention; and FIGURE 7 illustrates a typical pure fluid amplifier which may be used in said third species.

FIGURES 1 and 2 respectively show plan and perspective views of a first species of this invention wherein a radiant energy reflecting mirror 10 mounted in weather vane fashion has its angle of deflection determined by which one of a plurality of jet nozzles has a fluid jet emerging therefrom. The fluid may either be liquid or gas (such as air). Said mirror element 10 is preferably in the form of a thin wafer of rectangular shape having a reflecting surface portion 12 on at least one of its major faces. Mirror 10 is mounted for pivotal movement about an axis 14 which lies along one of the element edges 16 as best shown in FIGURE 2. Mirror 10 should be free to rotate at least through some predetermined maximum angle defined by a pair of first and second imaginary lines or rays 18 and 20 which radially extend from axis 14. The particular maximum angle through which mirror 10 should be rotatable depends upon the exact purpose to which the apparatus is to be put, e.g., the number of discrete mirror displacements required, the length of the display scale, etc. For the purpose of describing FIGURES 1 and 2, it is assumed that the angle made by the outer lines 18 and 20 is 40° which is divided into four equal smaller angles of 10° each. Consequently, there are five discrete angular positions or displacements of mirror 10 within this defined 40° angle, with each said discrete position being shown in FIGURE 1 by the center lines 18, 22, 24, 26, and 20.

The mirror deflecting agency is comprised of fluid nozzle means situated within the alternate angle formed by the rearward extensions 18' and 20' of respective lines 18 and 20. In FIGURES 1 and 2, said fluid nozzle means comprises a plurality of fluid nozzles 28, 30, 32, 34, and 36 each of which is adapted to selectively issue a fluid jet stream when its respective source of fluid 38, 40, 42, 44, and 46 is actuated. In order to reduce the complexity of the perspective view in FIGURE 2, only nozzles 32, 30, and 28 are there shown, but it is to be understood that the other two nozzles 34 and 36 would be present if a complete perspective view were illustrated. All of these fluid nozzles are so oriented such that the fluid jet stream issued by each follows a respectively different one of the radial line rearward extensions 18', 22', 24', 26', and 20', so as to impinge upon mirror element 10 at its pivoted edge 16. The actual cross sectional flow area of each fluid nozzle should be such that, relative to (1) the distance between the nozzle and mirror 10, (2) the energy of the fluid stream, (3) the degree of divergence of the stream by the time it impinges upon mirror 10, and (4) the thickness of mirror 10, the action of the jet as it separates and flows along the two major faces of mirror 10 produces a force tending to pivot and align mirror element 10 parallel with and within the activated jet. To illustrate, assume that fluid source 38 is activated at the time that mirror 10 occupies the angular position shown in FIGURE 1 along center line 24. The fluid jet stream issuing from nozzle 28 impinges upon mirror 10 at pivoted edge 16 in a manner to create a force tending to pivot mirror 10 in a clockwise direction so as to become aligned with radial ray 18. Since mirror 10 is freely pivoted about axis 14, there is no counter-acting force which would oppose the fluid force so created by a jet from nozzle 28. Consequently, rotation of mirror 10 is effected such that it becomes aligned with the flow axis of the fluid jet from nozzle 28. This mirror 10 position is thereafter maintained at least as long as the fluid jet from nozzle 28 appears, since the fluid in said jet separates and flows along each major face of mirror 10 in order to prevent any further rotation in either direction from the line 18 position. If the nozzle 28 jet is thereafter terminated without any other jet being initiated, mirror 10 will tend to remain in its angular position along line 18 in those environments where pivot axis 14 is vertical such that the force of gravity will not affect mirror 10. A fluid jet from any other nozzle now causes a rotation of mirror 10 away from position 18 and in alignment with the activated fluid jet. FIGURE 2 shows that the orientation of each fluid nozzle is also such that the flow axis of the jet issuing therefrom is essentially perpendicular to pivot axis 14. While this may be the preferred orientation, it would also be possible to have one or more of the fluid nozzles slightly tilted up and down so that its jet makes other than a right angle with axis 14 just so long as the angle made by each fluid jet in a plane of mirror rotation differs according to the showing of FIGURE 1.

As described generally above, the purpose of deflecting mirror 10 to different angular positions is to change the path of a radiant energy beam in a manner to indicate the particular position at which mirror 10 resides. A source of radiant energy 48, which may be an incandescent bulb emitting visible light, is located such that a beam of light projected therefrom in a predetermined direction will impinge upon the light reflecting surface 12 of mirror 10 at different acute angles for the different mirror positions possible. In order to form this beam of light from source 48, an aperture 50 and lens 52 may be provided such that the incident beam of light 54 has a path as indicated in FIGURE 1. These elements 48, 50, and 52 are not shown in FIGURE 2 in order to simplify the perspective showing. A change in the angle of incidence of the beam on mirror 10, and hence a change in angle of reflection therefrom, is directly proportional to the change in angular position of mirror 10. For example, if there is a 30° angle of incidence between the beam and mirror for a mirror position along the radial line 24, then the angle between the mirror and the reflected beam 56 is also equal to 30°. If mirror 10 now changes to a position along center line 26 which is 10° away from position 24, then both the angle of incidence and the angle of reflection become equal to 20°, i.e., a 10° change. Conversely, if the mirror 10 is rotated 10° to position 22 from position 24, then both the angle of incidence and angle of reflection increase by 10° to a value of 40°. A 10° change from position 22 to position 18 increases both these angles by 10° to a value of 50°. Consequently, the path taken by the reflected radiant energy beam 56 is changed with a change in mirror angular position about pivot axis 14. By now providing some form of utilization means in the path of the reflected light beam which responds to changes in the angle of reflection, it is now possible to obtain an indication of which fluid nozzle is active. Such a utilization means can take the form of a screen 58 containing visual indicia, such as alphabetic characters or numbers a different one of which is illuminated for each different mirror angular position. Such a screen 58 is shown in FIGURES 1 and 2 which carries five numbers 1 through 5 spaced apart and located at respective screen positions 60, 62, 64, 66, and 68. By making screen 58 in the form of a circular arc with a center of radius at pivot axis 14, located a relatively long distance away from pivoted mirror 10 said numerals may be approximately equally spaced apart one from the other since the five different paths taken by the reflected light beam for the respective five different discrete mirror positions will impinge upon said screen at approximately equally spaced increments. However, other spacings of the indicia on the screen are possible, as well as different geometrical configurations of the screen according to the visual representation desired. Thus, it is seen that for each mirror position, a reflected light beam therefrom impinges upon only one of the screen indicia in order to illuminate same for the purpose of visual inspection by an observer normally situated on the other side of the screen from mirror 10.

As an example of a fluid source for any of the fluid nozzles in FIGURE 1, FIGURE 3 shows a plan view of a typical pure fluid bistable amplifier which may be found at the output of a pure fluid data processing system. This amplifier, well known in the prior art, is comprised of a plurality of interconnected fluid channels which are cut or otherwise formed within body 70 of fluid impervious material such as transparent plastic or the like. A power stream input channel 72 has relatively high energy fluid supplied thereto via an entry port 74 generally at a right angle to the flow axis of the fluid amplifier channels. Power stream channel 72 narrows to a nozzle 76 which terminates in one end wall of a fluid interaction chamber 78. Power stream output channels 80 and 82 branch from the opposite end of channel 78 and are separated from each other by a fluid divider edge 84 which is normally symmetrically disposed with respect to the flow axis of nozzle 76. Two control stream input channels 86 and 88 also terminate in opposite side walls of chamber 78, with each control stream channel in turn being selectively supplied with lower energy control fluid via respective ports 90 and 92. The dimensions of all fluid channels in body 70 are so adjusted relative to the fluid pressures used that a power stream jet issuing from the nozzle 76 into chamber 78 can be deflected in its entirety without losing its integrity into either one of the output channels 80 or 82 by means of a selectively applied control fluid stream from channel 88 or 86. Furthermore, the fluid amplifier in FIGURE 3 can be so designed as to have a bistable characteristic in that power stream flow remains in an output channel to which it is deflected even after termination of the deflecting control stream. Said bistable characteristic in FIGURE 3 is accomplished by the well known boundary layer effect which can be enhanced by providing cusps 94 and 96 in the respective power stream output channels 80 and 82. When the fluid amplifier of FIGURE 3 is used for any one of the sources 38, etc. in FIGURE 1, then only one power stream output channel 82 therefrom is connected to the respective fluid nozzle. The other power stream output channel 80 may terminate in an exhaust port 98 for directing power stream flow back to the source of power stream fluid.

FIGURES 4 and 5 show a second species of the present invention wherein mirror deflection is determined by the total number of fluid nozzles having fluid jet streams emerging therefrom. A mirror element 100 in the form of a thin wafer is mounted or suspended for rotation around a pivot axis 101 which in turn is biased in some manner so as to force the mirror toward one predetermined position within its limits of movement. For example, said biasing means may be provided by a coiled spring 102 having one end affixed to pivot axis 101 and its other end affixed to a support 104. Since spring 102 attempts to unwind itself, it applies a force against pivot axis 101 which attempts to rotate same in a clockwise direction as viewed in FIGURE 4. This in turn attempts to move mirror 100 toward the outer position 106 within desired arc movement. A stop, not shown, may be provided to prevent clockwise mirror rotation past position 106. Situated within the alternate angle formed by the rearward extensions 106′ and 114′, is a plurality of four fluid jet nozzles 116, 118, 120, and 122 best shown in FIGURE 5. Each of these nozzles in turn has a respective individual source of fluid 126, 128, 130, and 132 which can be selectively actuated in order to cause a fluid jet to issue from its respective nozzle. The orientation of the nozzles in FIGURES 4 and 5 differs from the orientation of those in FIGURES 1 and 2 in that the fluid jet stream from each nozzle in the second species impinges upon the pivoted edge 103 of mirror 100 at the same angle (as measured in a plane of mirror rotation) rather than at different angles as is the case for the first species. Thus, each fluid jet stream applies a force to mirror 100 by virtue of a change in its direction at the point of impingement which attempts to rotate mirror 100 to become aligned with and within the fluid jet stream in the position shown by line 114 in FIGURE 4. However, any fluid force applied by an activated fluid stream must work against the bias applied by spring 102 which in turn attempts to maintain mirror 100 at position 106. Spring 102 acts according to Hook's law such that the force applied by it to pivot axis 101 is directly proportional to its strain, or in other words, is directly proportional to the degree of displacement of mirror 100 away from position 106. The energy of each fluid stream emerging from the fluid nozzles may be so related such that each stream applies an equal amount of force to mirror 100 in order that the mirror can assume different discrete positions for different numbers of fluid streams impinging thereon. For example, in the absence of any fluid stream from the nozzle means, mirror 100 is assumed to occupy position 106. If only one fluid stream emerges from any one of the nozzles, then the fluid force applied to mirror 100 is sufficient to rotate the mirror to position 108. If any two of the fluid nozzles are activated, the two fluid streams thus impinging on mirror 100 apply a force sufficient to overcome the bias of spring 102 to a degree causing mirror positioning along line 110 in FIGURE 4. Any three fluid streams impinging on mirror 100 causes its rotation to position 112, while all four fluid streams cause a mirror position at 114. Thus, a variety of logical functions is possible with the structure of FIGURES 4 and 5. To illustrate, a mirror position at 108 signifies an exclusive OR function of said four inputs, since said deflection can only occur when only one fluid jet is present. On the other hand, a mirror position at 114 indicates that all four jets are present thus resulting in an AND logical function. Furthermore, the energy of each fluid stream emerging from the nozzles may be increased to a value such that by itself it is able to rotate mirror from position 106 to position 114, in which case the system would provide an OR function of said four inputs under the assumption that the mirror cannot further rotate counterclockwise from position 114 even if all four jets are on. Other logical functions are also possible.

As was the case for FIGURES 1 and 2, a utilization means in the form of structure carrying visual indicia is provided in the path of the changing reflected light beam which originates at source 134 via aperture 136 and lens 138. FIGURE 4 shows an alternative construction of this visual utilization means which can comprise a circular inner mask 144 having indicia outlines cut therethrough at certain discrete points so that light passing through the mask will impinge upon a circular ground glass blank screen 146 in order to display the character silhouette. Mask 144 and screen 146 are not shown in FIGURE 5 in order to simplify the perspective view. However, if the center of radius of each is taken at pivot axis 101, then said characters are approximately equally spaced apart in the manner previously described in connection with screen 58 in FIGURE 1.

FIGURE 6 shows a modification of FIGURES 4 and 5 such as to result in a third species of the present invention. Like elements are identified by corresponding primed numbers in FIGURE 6. FIGURE 6 employs a single fluid nozzle 158 which is connected to a source 160 of variable fluid pressure used to selectively vary the energy of the fluid stream impinging on mirror 100'. FIGURE 6 thus differs from the second species of FIGURES 4 and 5 by employing only one fluid nozzle rather than a plurality of fluid nozzles in order to vary the magnitude of fluid pressure applied to the mirror. As an example of a suitable source 160 for use in the species of FIGURE 6, FIGURE 7 shows a pure fluid amplifier of the proportional type wherein the quantity of fluid flow in one output channel thereof may be varied within a range of values by varying the magnitude of a fluid control input signal. This amplifier is comprised of a plurality of interconnected fluid channels formed in a body 162 of impervious material such as transparent plastic. A power stream input channel 164 is supplied fluid via a port 166. This power stream input channel terminates in a nozzle orifice 168 located in one end wall of a fluid interaction chamber 170. Branching from the chamber 170 are two power stream output channels 172 and 174 which are separated by a divider edge 176 asymmetrically located with respect to the flow axis of nozzle 168 such that the normal undeflected flow path of the power stream takes most, if not all, of it through output channel 172. A single control input channel 178 is provided which receives control fluid via a port 180 from means not shown. When a fluid stream from channel 178 exits into chamber 170, it impinges upon a power stream from nozzle 168 and by virtue of momentum exchange, deflects more of the power stream fluid into output channel 174. Thus, the magnitude of the control stream determines the actual magnitude of power stream fluid flow in channel 174 which in turn can be connected to nozzle 158 in FIGURE 6. Consequently, mirror deflection in FIGURE 6 is proportional to the control fluid flow strength applied to channel 178 of the fluid amplifier in FIGURE 7.

Although several embodiments of the present invention have been shown and described, modifications thereto will be obvious to persons skilled in the art without departure from the novel principles defined in the appended claims.

The embodiments of the invention in which an exclusive property or privilege is claimed are defined as follows:

1. Apparatus comprising:
  (a) a plane radiant energy reflecting element in the shape of a thin wafer which is pivotally supported about an axis lying along one edge thereof such that a radiant energy reflecting surface thereon is movable through a predetermined first angle defined by imaginary first and second lines radially extending from said pivot axis;
  (b) fluid source means, fluid nozzle means coupled to said fluid source means, said nozzle means being located within the angle formed by said first and second lines radially extending from said pivot axis in the opposite direction, and oriented such that fluid jet flow therefrom impinges upon said one edge in a manner to apply a force thereto attempting to pivot and align said element in a position parallel to and within said fluid jet flow;
  (c) means emitting a beam of radiant energy in a fixed predetermined direction to impinge upon a different portion of said reflecting surface for each different position of said element within said first angle such that the path of said beam when reflected from said surface is different for each different element position; and
  (d) utilization means situated in the path of said reflected beam for indicating the element position.

2. Apparatus according to claim 1 wherein said fluid source means connected to said fluid nozzle means is selectively actuable.

3. Apparatus according to claim 1 wherein said fluid nozzle means comprises a single fluid nozzle adapted to issue a fluid jet stream.

4. Apparatus according to claim 1 wherein said fluid nozzle means comprises a plurality of individual fluid nozzles each adapted to selectively issue an individual fluid jet stream.

5. Apparatus according to claim 4 wherein said plurality of fluid nozzles are oriented such that the fluid jet stream from each makes a different angle with said one edge in the plane of said element rotation.

6. Apparatus according to claim 4 wherein said plurality of fluid nozzles are oriented such that the fluid jet stream from each makes the same angle with said one edge in the plane of said element rotation and biasing means coupled to said element for normally biasing said element to a predetermined angular position.

7. Apparatus comprising:
  (a) a plane mirror element in the shape of a thin wafer which is freely pivotally supported about an axis lying along one edge thereof such that a radiant energy reflecting surface thereon is movable through a predetermined first angle defined by imaginary first and second lines radially extending from said pivot axis;
  (b) fluid source means, a plurality of fluid nozzles coupled to said fluid source means, said nozzles being located within the angle formed by said first and second lines radially extending from said pivot axis in the opposite direction, and oriented such that the fluid jet stream from each impinges upon said mirror one edge, but at a different angle therewith in the plane of mirror rotation, so that it applies a force thereto attempting to pivot and align said mirror element in a position parallel to and within said fluid jet stream;
  (c) means emitting a beam of radiant energy in a fixed predetermined direction to impinge upon a different portion of said mirror reflecting surface for each different position of said mirror element within said first angle such that the path of said beam when reflected from said surface is different for each different mirror position; and
  (d) utilization means situated in the path of said reflected beam for indicating the mirror position.

8. Apparatus according to claim 7 which further includes a different selectively actuable source of fluid connected to each fluid nozzle for individually supplying thereto fluid of sufficient energy to align said mirror therewith.

References Cited

UNITED STATES PATENTS 3,205,768  9/1965  Coombs et al. _____ 250—230
3,237,856  3/1966  McNaney _____ 346—108

DAVID H. RUBIN, *Primary Examiner.*

JEWELL H. PEDERSEN, *Examiner.*

R. J. STERN, *Assistant Examiner.*